July 29, 1924.
O. C. PACHOLKE
APPARATUS FOR KILLING POULTRY
Filed April 16, 1923
1,503,372
2 Sheets-Sheet 2
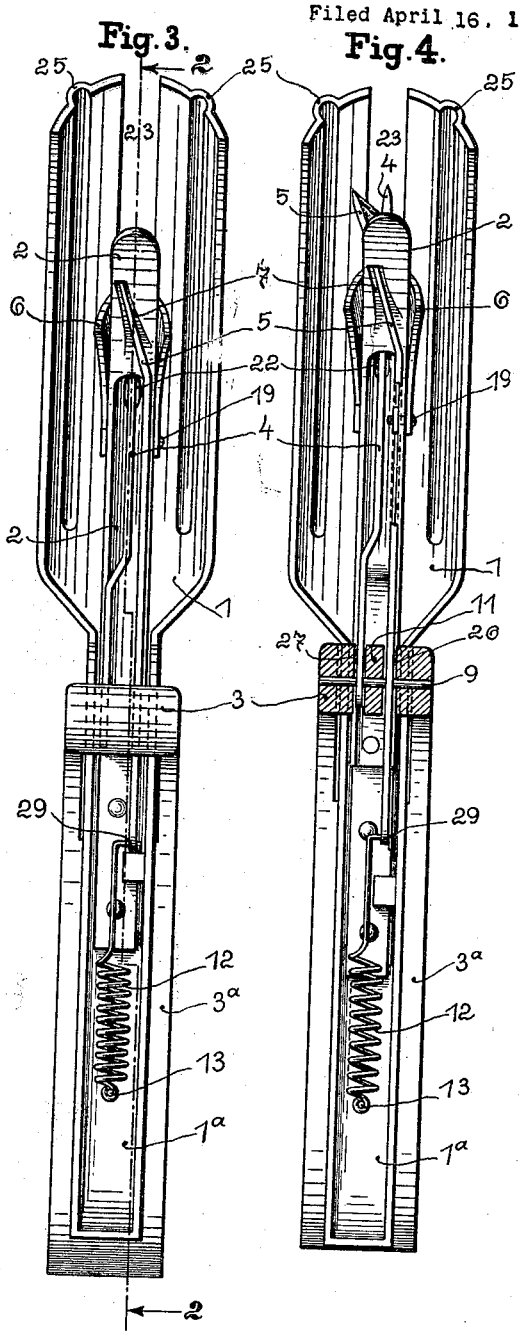
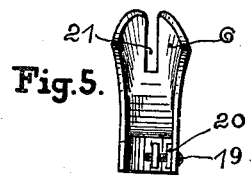
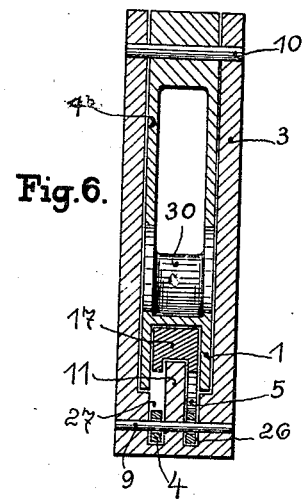
Inventor
O. C. Pacholke Patented July 29, 1924.

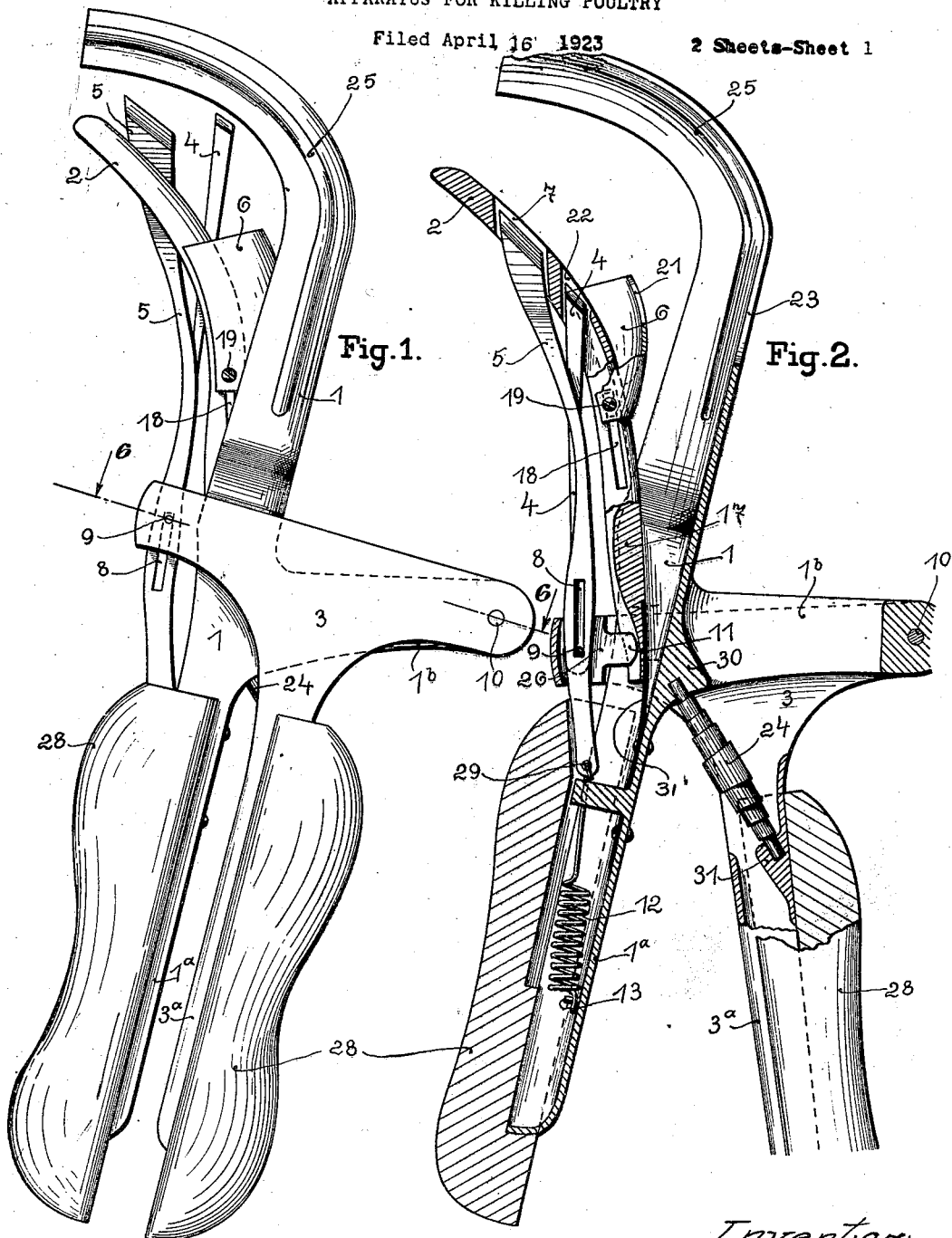

1,503,372

UNITED STATES PATENT OFFICE.

OTTO CARL PACHOLKE, OF BROOKLYN, NEW YORK.

APPARATUS FOR KILLING POULTRY.

Application filed April 16, 1923. Serial No. 632,513.

*To all whom it may concern:*

Be it known that I, OTTO CARL PACHOLKE, engineer, a citizen of the United States of America, residing in Brooklyn, New York, 1771 East 18th Street, have invented new and useful Improvements in and Relating to Apparatus for Killing Poultry, of which the following is a specification.

My invention relates to improvements in apparatus for killing poultry, and the object of the improvements is to provide a hand operated apparatus which is easily handled by being operated by one hand in the manner of a pair of scissors or a tongs, and which stuns the poultry prior to killing. With this object in view my improved apparatus is in the form of a pair of tongs carrying two consecutively operative devices one for stunning the poultry and the other for cutting the throat of the same. The apparatus is constructed so that the head of the animal can be passed into the same for holding the animal and preventing the same from moving sideways when the said devices are operated. By means of my improved apparatus the poultry is killed in the proper way and thereafter bled.

By thus killing the poultry meat of improved quality is obtained. More particularly the poultry can be more readily plucked, and by being thoroughly bled the meat has a better appearance, it has a good taste, and it can be preserved without requiring measures for storing and shipping.

For the purpose of explaining the invention an example embodying the same has been shown in the accompanying drawings, in which—

Fig. 1, is an elevation showing the apparatus in closed position and with the piercing and cutting implements in their forward or end positions, Fig. 2, is a vertical section taken on the line 2—2 of Fig. 3 and showing the apparatus open and with the piercing and cutting implements in their rear positions, Fig. 3, is an elevation looking from the left in Fig. 1 and with the grips of the handles removed, Fig. 4, is an elevation partly in section looking from the left in Fig. 2, Fig. 5, is an elevation showing a detail, and Fig. 6, is a section taken on the line 6—6 of Fig. 1 and looking in the direction of the arrows.

The same reference characters have been used in all the views to indicate corresponding parts.

My improved apparatus comprises a member 1 bent forwardly at one end and formed with a trough shaped depression adapted to receive the head of the animal to be killed, and at its middle with a longitudinal slot 23, a member 2 elastically connected with the member 1, and a member 3 jointed to an arm 1$^b$ of the member 1 at 10. In the example shown in the figures the said members 1, 2, 3 are U-shaped in cross-section, which U-form is open in the members 1 and 2 at the upper ends and in the member 3 at the bottom end, as appears from Figs. 2, 3, and 4. In slots 27 and 26 of the member 3 a sharp piercing tool 4 and a cutting tool 5 are mounted, as is best shown in Fig. 6, and the tool 4 is pivotally mounted on a pin 9 and the tool 5 preferably engages the said pin with a slot 8, its rear end 29 being connected by a coiled spring 12 to a pin 13 secured to the handle 1$^a$ of the member 1. The tools 4 and 5 are passed through slots 22 and 7 made in the solid upper part of the member 2, the slot 22 being disposed substantially in the longitudinal median plane of the member 2 and the slot 7 laterally thereof. Where the member 1 is made from sheet metal I prefer to form the same with longitudinal reinforcing depressions 25, and its arm 1$^b$ is made integral with the body thereof for example by pressing, or it is riveted or otherwise secured thereto. The handle portion 1$^a$ is reduced in breadth as compared to the body part, and to the reduced part the inner member 2 is connected by means of a leaf spring 31′ secured to the said parts by means of screws or rivets, said spring holding the front end of the member 2 upwardly when the apparatus is in open position, as is shown in Fig. 2. The member 2 is slotted at its median part as is shown at 18, and the slot 18 is engaged by a lug 20 of a member 6 in the form of a cap, which is adjustable in the slot by means of a screw 19, and the cap 6 is formed at its front and top end with a slot 21. The cap 6 is adapted to receive the beak of the animal. At its rear end the member 2 is formed with an enlarged or cam position 17 adapted to be engaged by a lug 11 of the upper part of the member 3 when the said member is rocked for pressing the member 2 towards the member 1.

The member 3 bears on the member 1 through the intermediary of a spring 24 bearing with its ends on lugs 31 and 30 provided on the said members. The parts 1 and 3 are normally held by the spring in open position, as is shown in Fig. 2.

The animal to be killed is preferably hung up by its feet, its head being thereby directed downwardly. The beak of the bird is then opened and the portion 2 of the instrument is passed into the bird's mouth to such an extent that the upper part of the beak is engaged by the cap 6. When the instrument is in this position the handles 28 of the instrument are pressed together whereby the member 3 will be rocked forwardly from the position shown in Fig. 2 and owing to the action of the lug 11 on the cam surface of the member 17 the members 2 and 1 will be pressed towards each other and the head of the bird thereby securely held in the trough shaped depression of the member 1; also, the rocking movement of the member 3 will cause a sliding movement of the tool 4 relatively to the member 2 whereby the said tool 4 will be projected forwardly owing to its pivotal connection 9 with the member 3 and the point thereof will be forced into the head of the bird thereby piercing the brain. After the member 3 has been rocked forwardly a certain distance and the tool 4 partially projected, the pin 9 mounted on the said member 3 will engage the end of the slot 8 in the shank of the knife 5 whereupon the continued rocking motion of the member 3 will cause the projection of the knife against the tension of the spring 12 from the position indicated in Fig. 2 of the drawings in which it bears on the stop 14, such knife thereby being caused to sever the artery of the bird.

The operations of piercing the brain and severing the artery are performed in immediate succession by the instrument hereinbefore described and after the operation when pressure on the handles is released, the spring 24 will automatically return the handles and their associated parts into the position indicated in Fig. 2 whereby the instrument will be ready for operating on another bird.

The cap 6 can be set in different positions within the slot 18 according to the size of the animal being killed and the length or the breadth of the beak, also if desired it may be entirely dispensed with. I wish it to be understood that I do not limit myself to the specific construction shown herein. For example the joint of the member 2 to the member 1 consisting of the spring 31 and the guiding means for the knife 5 within the member 3 may be made in a different way. Also it is not essential that the piercing tool 4 and the cutting tool 5 should be so mounted upon the member 3 that said tools may be projected successively. If desired such tools may be mounted upon the member 3 in such manner that they may be projected simultaneously.

Furthermore, instead of the member 3 other means may be provided for operating the piercing and cutting implements 4 and 5.

I claim:—

1. In an apparatus for killing poultry, the combination, with an outer member bent into the form of a hook and formed with a depression and adapted to receive the head of the animal, of an inner member jointed to said outer member and adapted to be moved towards the same, piercing and cutting tools guided within said inner member, and an operating member adapted to operate said piercing and cutting members.

2. In an apparatus for killing poultry, the combination, with an outer member bent into the form of a hook and formed with a depression and adapted to receive the head of the animal, of an inner member jointed to said outer member and adapted to be moved towards the same, piercing and cutting tools guided within said inner member, and an operating member adapted successively to operate said piercing and cutting members.

3. In an apparatus for killing poultry, the combination, with an outer member adapted to receive the head of the animal, an inner member, and an operating member, of a piercing tool jointed to said operating member and guided by said inner member in position for piercing the head of the animal, a knife elastically connected with said outer member and guided by said inner member and in pin and slot engagement with said operating member for operation thereby after a certain operative stroke thereof.

4. In an apparatus for killing poultry, the combination, with pivoted inner and outer members, the latter of which is adapted to receive the head of the animal, of an operating member jointed to said outer member, said outer and operating members being provided each with a handle and piercing and cutting devices adapted to be successively operated by said operating member.

5. In a apparatus for killing poultry, the combination, with an outer member adapted to receive the head of the animal, and an inner member pivoted to said outer member, said inner member being formed with a projection, of piercing and cutting tools in position for piercing the brain and cutting the artery of the animal, and an operating member jointed to said outer member and adapted to engage said projection for pressing the inner member towards the outer member and to successively operate said piercing and cutting tools.

6. In an apparatus for killing poultry, the combination, with an outer member adapted to receive the head of the animal and an inner member jointed to said outer member, said inner member being provided with slots, of piercing and cutting tools in position for piercing the brain and cutting the artery of the animal and guided in said slots, and an operating member for said tools.

7. In an apparatus for killing poultry, the combination, with an outer member adapted to receive the head of the animal, and an inner member jointed to said outer member, of piercing and cutting tools guided by said inner member in position for piercing the brain and cutting the artery of the animal, the piercing member being guided within the longitudinal median plane of the inner member and the cutting tool laterally thereof, and means for operating said piercing and cutting tools.

8. In an apparatus for killing poultry, the combination, with a pair of jointed members, one of which is adapted to receive the head of the animal to be killed, and means between said members and carried by one of them for holding the upper part of the beak of the animal, of piercing and cutting tools in position for piercing the brain and cutting the artery of the animal, and operating means for said members.

9. In an apparatus for killing poultry, the combination with an outer member adapted to receive the head of the animal and an inner member jointed to said outer member, the outer member being longitudinally slotted at the end designed for receiving the head of the animal, of piercing and cutting tools in position for piercing the brain and cutting the artery of the animal, and means for successively operating said tools.

10. In an apparatus for killing poultry, the combination, with an outer member adapted to receive the head of the animal and an inner member jointed thereto, the outer member being formed of sheet metal having longitudinal reinforcing depressions and carrying an arm, of piercing and cutting tools in position for piercing the brain and cutting the artery of the animal, and an operating member jointed to said arm and adapted successively to operate said piercing and cutting members.

11. In an apparatus for killing poultry, the combination, with a pair of jointed members one of which is adapted to receive the head of the animal to be killed, and a cap shaped member between said members and adjustably mounted on one of said members for holding the upper part of the beak of the animal being killed, of piercing and cutting tools in position for piercing the brain and cutting the artery of the animal, and means for successively operating said tools.

12. In an apparatus for killing poultry, the combination with an outer member adapted to receive the head of the animal, an inner member jointed to said outer member and adapted to be placed within the mouth of the animal and to be moved towards the outer member, piercing and cutting tools guided within said inner member, and an operating member adapted to operate said piercing and cutting members.

In testimony whereof I hereunto affix my signature in the presence of the witness.

OTTO CARL PACHOLKE.

Witness:
S. H. GREENE.